(12) United States Patent
Schmitz et al.

(10) Patent No.: US 11,142,103 B2
(45) Date of Patent: Oct. 12, 2021

(54) CROSS MEMBER FOR SEAT RECLINER ASSEMBLY

(71) Applicant: FISHER & COMPANY, INCORPORATED, St. Clair Shores, MI (US)

(72) Inventors: Ralph L. Schmitz, Clinton Township, MI (US); Sapan M. Poptani, Northville, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 16/722,230

(22) Filed: Dec. 20, 2019

(65) Prior Publication Data

US 2020/0231070 A1    Jul. 23, 2020

Related U.S. Application Data

(60) Provisional application No. 62/793,461, filed on Jan. 17, 2019.

(51) Int. Cl.
*B60N 2/225* (2006.01)
*B60N 2/235* (2006.01)

(52) U.S. Cl.
CPC ......... *B60N 2/2255* (2013.01); *B60N 2/2258* (2013.01); *B60N 2/2356* (2013.01); *B60N 2205/50* (2013.01)

(58) Field of Classification Search
CPC ...... B60N 2/22; B60N 2/2255; B60N 2/2258; B60N 2/2356; B60N 2/943; B60N 2002/952; B60N 2205/50
See application file for complete search history.

(56) References Cited

U.S. PATENT DOCUMENTS

| | | | |
|---|---|---|---|
| 343,025 | A | 6/1886 | Gordon |
| 910,192 | A | 1/1909 | Grouvelle |
| 4,218,092 | A | 8/1980 | Schach et al. |
| 4,223,586 | A | 9/1980 | Miller |
| 4,451,966 | A | 6/1984 | Lee |

(Continued)

FOREIGN PATENT DOCUMENTS

| | | | | |
|---|---|---|---|---|
| DE | 3325045 C2 | * | 2/1988 | ............... B60N 2/22 |
| DE | 102012005697 A1 | * | 9/2012 | ........... B60N 2/2362 |
| WO | WO-2015023058 A1 | * | 2/2015 | |

*Primary Examiner* — James M Ference
(74) *Attorney, Agent, or Firm* — Harness, Dickey & Pierce, P.L.C.

(57) ABSTRACT

A vehicle seat recliner assembly includes a first recliner heart, a second recliner heart, hand lever and a cross member. The first recliner heart is mounted to a bracket. The second recliner heart is mounted to another bracket. The hand lever is mounted to the first recliner heart and rotatable relative to the brackets to move the first recliner heart between a locked state and an unlocked state. The cross member is connected to the first and second recliner hearts and transmitting torque from the hand lever to the second recliner heart to move the second recliner heart with the first recliner heart between the locked and unlocked states. The cross member has a central part and a plurality of projections extending radially around and from the central part such that the plurality of projections are spaced apart from each other.

18 Claims, 11 Drawing Sheets

(56) References Cited

U.S. PATENT DOCUMENTS

| | | | |
|---|---|---|---|
| 4,470,633 A * | 9/1984 | Fourrey | B60N 2/22 297/362 |
| 4,509,806 A | 4/1985 | Dudouyt | |
| D285,119 S | 8/1986 | Krautz | |
| 4,698,896 A | 10/1987 | Osterwald et al. | |
| D325,801 S | 4/1992 | Fasth | |
| 5,158,389 A | 10/1992 | Osterwald et al. | |
| 5,586,833 A * | 12/1996 | Vossmann | B60N 2/2252 403/359.6 |
| D415,847 S | 10/1999 | Schaefer | |
| 6,007,153 A | 12/1999 | Benoit et al. | |
| 6,024,410 A * | 2/2000 | Yoshida | B60N 2/2358 297/301.1 |
| 6,161,899 A | 12/2000 | Yu | |
| 6,283,159 B1 | 9/2001 | Tada | |
| 6,309,019 B1 * | 10/2001 | Downey | B60N 2/0224 248/421 |
| 6,390,557 B1 | 5/2002 | Asano | |
| 6,454,354 B1 * | 9/2002 | Vossmann | B60N 2/2358 297/367 R |
| 6,626,495 B2 * | 9/2003 | Okazaki | B60N 2/236 297/367 R |
| 6,836,951 B2 | 1/2005 | Dudash et al. | |
| D503,645 S | 4/2005 | Wirth et al. | |
| 7,014,265 B2 | 3/2006 | Yamada et al. | |
| 7,093,902 B2 * | 8/2006 | Lehmann | B60N 2/22 297/361.1 |
| 7,503,099 B2 | 3/2009 | Pejathaya | |
| 7,506,933 B2 * | 3/2009 | Yamada | B60N 2/22 297/364 |
| 7,513,573 B2 | 4/2009 | Wahls et al. | |
| 7,837,266 B2 * | 11/2010 | Lehmann | B60N 2/225 297/362.12 |
| 7,871,128 B2 | 1/2011 | Bonk et al. | |
| D666,330 S | 8/2012 | Stamper | |
| 8,251,451 B2 * | 8/2012 | Dziedzic | B60N 2/236 297/367 P |
| 8,430,454 B2 * | 4/2013 | Tanguy | B60N 2/236 297/367 L |
| 8,528,977 B2 * | 9/2013 | Naughton | B60N 2/2356 297/354.12 |
| 8,585,149 B2 * | 11/2013 | Villarroel | B60N 2/236 297/367 R |
| 8,616,648 B2 * | 12/2013 | Holzhueter | B60N 2/236 297/367 P |
| 8,641,145 B2 * | 2/2014 | Schwarze | B60N 2/236 297/367 R |
| 8,641,146 B2 * | 2/2014 | Suzuki | B60N 2/2362 297/367 R |
| 9,108,541 B2 | 8/2015 | Assmann et al. | |
| D745,299 S | 12/2015 | Chang | |
| D764,140 S | 8/2016 | Holzhaeuser | |
| 9,511,693 B2 * | 12/2016 | Nakagawa | B60N 2/682 |
| D786,172 S | 5/2017 | Komazaki et al. | |
| D787,421 S | 5/2017 | Komazaki et al. | |
| D788,018 S | 5/2017 | Komazaki et al. | |
| 9,751,432 B2 | 9/2017 | Assmann | |
| 9,878,641 B2 * | 1/2018 | Gallienne | B60N 2/236 |
| D809,994 S | 2/2018 | Braddock, III | |
| 10,065,537 B2 * | 9/2018 | Noguchi | B60N 2/2356 |
| 10,071,656 B2 * | 9/2018 | Wetzig | B60N 2/23 |
| 10,800,296 B2 * | 10/2020 | Schmitz | B60N 2/236 |
| 2002/0000746 A1 * | 1/2002 | Matsuura | B60N 2/2362 297/366 |
| 2002/0014797 A1 | 2/2002 | Dudash et al. | |
| 2004/0084945 A1 * | 5/2004 | Toba | B60N 2/236 297/367 R |
| 2005/0099049 A1 * | 5/2005 | Spey | B60N 2/22 297/361.1 |
| 2006/0202537 A1 * | 9/2006 | Smuk | B60N 2/236 297/366 |
| 2008/0073961 A1 | 3/2008 | Wahls et al. | |
| 2008/0185892 A1 * | 8/2008 | Peters | B60N 2/433 297/362 |
| 2008/0231103 A1 * | 9/2008 | Rohee | B60N 2/20 297/354.1 |
| 2009/0134682 A1 * | 5/2009 | Andou | B60N 2/236 297/362.12 |
| 2009/0140565 A1 * | 6/2009 | Wahls | B60N 2/236 297/369 |
| 2009/0250990 A1 * | 10/2009 | Endo | B60N 2/236 297/367 P |
| 2009/0289488 A1 * | 11/2009 | Mitsuhashi | B60N 2/682 297/354.12 |
| 2009/0302658 A1 * | 12/2009 | Fassbender | B60N 2/236 297/367 P |
| 2010/0072802 A1 * | 3/2010 | Smith | B60N 2/2252 297/362 |
| 2010/0109408 A1 * | 5/2010 | Ohba | B60N 2/236 297/367 P |
| 2010/0117429 A1 * | 5/2010 | Mitsuhashi | B60N 2/2254 297/354.12 |
| 2010/0127546 A1 * | 5/2010 | Dziedzic | B60N 2/236 297/367 R |
| 2010/0150645 A1 * | 6/2010 | Endo | B60N 2/236 403/102 |
| 2010/0194165 A1 * | 8/2010 | Iguchi | B60N 2/2362 297/367 P |
| 2010/0231022 A1 * | 9/2010 | Kim | B60N 2/236 297/367 R |
| 2010/0244530 A1 * | 9/2010 | Kitano | B60N 2/2252 297/362 |
| 2010/0276976 A1 * | 11/2010 | Kumazaki | B60N 2/236 297/354.12 |
| 2011/0001346 A1 * | 1/2011 | Yamada | B60N 2/236 297/367 P |
| 2012/0242133 A1 * | 9/2012 | Jaudouin | B60N 2/2362 297/463.1 |
| 2012/0261976 A1 | 10/2012 | Uebelacker et al. | |
| 2012/0279337 A1 * | 11/2012 | Endo | B60N 2/236 74/411.5 |
| 2012/0280555 A1 * | 11/2012 | Blinzler | B60N 2/22 297/463.1 |
| 2012/0292970 A1 * | 11/2012 | Yamada | B60N 2/236 297/354.1 |
| 2012/0306251 A1 | 12/2012 | Arefi et al. | |
| 2013/0001997 A1 * | 1/2013 | Gallienne | B60N 2/682 297/354.12 |
| 2013/0026808 A1 * | 1/2013 | Uramichi | B60N 2/236 297/463.1 |
| 2013/0113261 A1 * | 5/2013 | Mikasa | B60N 2/2356 297/367 P |
| 2013/0154331 A1 * | 6/2013 | Ito | A47C 1/025 297/367 P |
| 2013/0161994 A1 * | 6/2013 | Ito | A47C 1/025 297/367 P |
| 2013/0233435 A1 | 9/2013 | Henthorn et al. | |
| 2013/0291676 A1 * | 11/2013 | Pleskot | B60N 2/2252 74/511 R |
| 2014/0103693 A1 * | 4/2014 | Yamada | B60N 2/236 297/354.12 |
| 2014/0152067 A1 * | 6/2014 | Pleskot | B60N 2/2218 297/354.12 |
| 2014/0159458 A1 * | 6/2014 | Lu | B60N 2/2356 297/366 |
| 2014/0232163 A1 | 8/2014 | Eckhoff et al. | |
| 2014/0265474 A1 * | 9/2014 | McCulloch | B60N 2/42709 297/216.14 |
| 2014/0284979 A1 * | 9/2014 | Nihonmatsu | B60N 2/682 297/325 |
| 2015/0015044 A1 * | 1/2015 | Teufel | B60N 2/2356 297/366 |
| 2015/0069809 A1 * | 3/2015 | Matt | B60N 2/2356 297/366 |
| 2015/0091354 A1 * | 4/2015 | Enokijima | B60N 2/2252 297/354.12 |
| 2015/0165936 A1 * | 6/2015 | Wei | B60N 2/2356 297/367 P |

(56) References Cited

U.S. PATENT DOCUMENTS

| | | | |
|---|---|---|---|
| 2015/0273548 A1 | 10/2015 | Tanoue et al. | |
| 2015/0306987 A1* | 10/2015 | Kitou | B60N 2/236 297/367 P |
| 2016/0046211 A1* | 2/2016 | Assmann | B60N 2/22 297/361.1 |
| 2016/0214508 A1* | 7/2016 | Jeong | B60N 2/22 |
| 2017/0021743 A1* | 1/2017 | Hiemstra | B60N 2/682 |
| 2017/0058940 A1 | 3/2017 | Wehner et al. | |
| 2017/0151893 A1* | 6/2017 | Kojima | B60N 2/236 |
| 2017/0158091 A1* | 6/2017 | Kojima | B60N 2/20 |
| 2017/0158092 A1* | 6/2017 | Kojima | B60N 2/236 |
| 2017/0253151 A1* | 9/2017 | Maeda | B60N 2/2356 |
| 2018/0056819 A1 | 3/2018 | Schmitz et al. | |
| 2018/0213936 A1* | 8/2018 | Sasaki | B60N 2/20 |
| 2018/0238474 A1 | 8/2018 | Braddock, III | |
| 2018/0334060 A1* | 11/2018 | Yamabe | B60N 2/42709 |
| 2018/0361886 A1* | 12/2018 | Chang | B60N 2/224 |
| 2020/0231070 A1* | 7/2020 | Schmitz | B60N 2/2255 |

\* cited by examiner

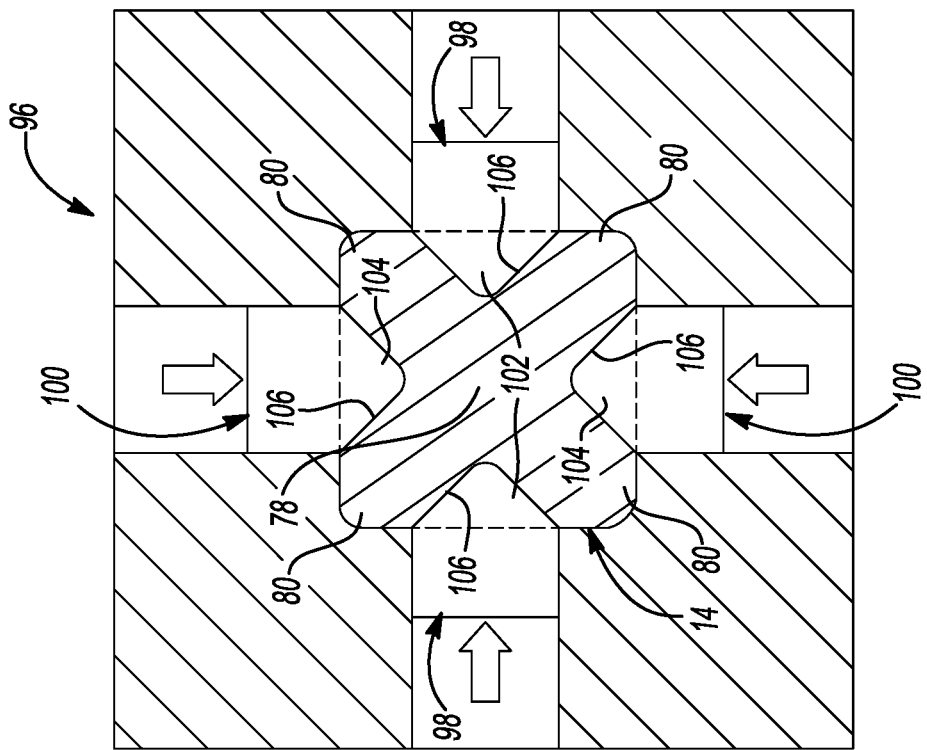
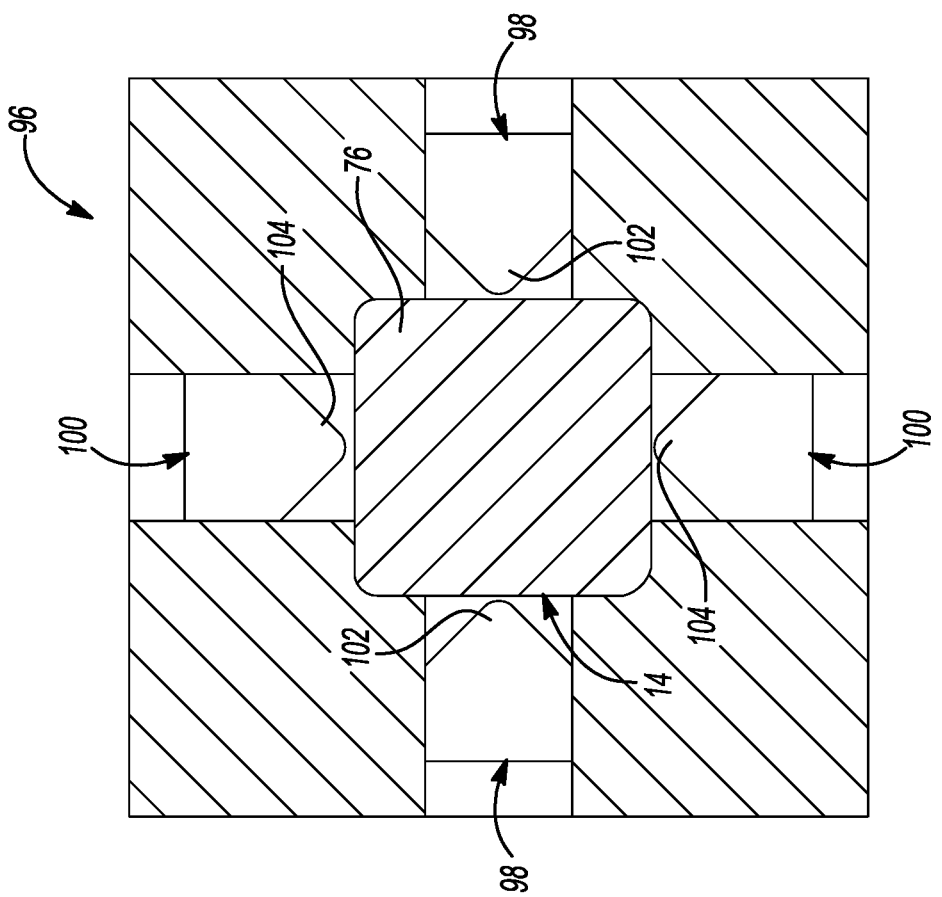

CROSS MEMBER FOR SEAT RECLINER ASSEMBLY

CROSS-REFERENCE TO RELATED APPLICATIONS

This application claims the benefit of U.S. Provisional Application No. 62/793,461, filed on Jan. 17, 2019. The entire disclosure of the above application is incorporated herein by reference.

FIELD

The present disclosure relates to a cross member for a seat recliner assembly.

BACKGROUND

This section provides background information related to the present disclosure and is not necessarily prior art.

Vehicle seats typically include a seat recliner assembly that allows selective adjustment of an angular position of a seatback relative to a seat bottom. Such seat recliner assemblies may include a pair of recliner mechanisms disposed at opposite ends of a base of the seatback to maintain torsional stiffness of the seatback when the seatback is in a locked position. Because each recliner mechanism maintains the seatback in the locked position, each recliner mechanism must be moved from a locked state into an unlocked state to permit movement of the seatback relative to the seat bottom. Because a single release handle is often employed to release both recliner mechanisms, both of the recliner mechanisms must be synchronized to lock and release simultaneously.

Such synchronization is often accomplished using a cross member that extends between the two recliner mechanisms and may transmit torque from the release mechanism to the recliner mechanisms. Typically, such cross members are solid metal rods having an axial end with a threaded aperture that allows the release handle to be secured to the cross member by a threaded fastener. Such solid cross members are quite expensive to produce. The present disclosure provides an improved cross member that is less expensive to produce and weighs less than conventional cross members while maintaining satisfactory performance.

SUMMARY

This section provides a general summary of the disclosure, and is not a comprehensive disclosure of its full scope or all of its features.

In one form, the present disclosure provides a vehicle seat recliner assembly that includes a first recliner heart, a second recliner heart, hand lever and a cross member. The first recliner heart is mounted to a bracket. The second recliner heart is mounted to another bracket. The hand lever is mounted to the first recliner heart and rotatable relative to the brackets to move the first recliner heart between a locked state and an unlocked state. The cross member is connected to the first and second recliner hearts and transmitting torque from the hand lever to the second recliner heart to move the second recliner heart with the first recliner heart between the locked and unlocked states. The cross member has a central part and a plurality of projections extending radially around and from the central part such that the plurality of projections are spaced apart from each other.

In some configurations of the seat recliner assembly of the above paragraph, the cross member includes a first portion and a second portion adjacent to the first portion. The central part and the plurality of projections define the first portion.

In some configurations of the seat recliner assembly of any one or more of the above paragraphs, the first portion has an X-shaped cross-section and the second portion has a rectangular-shaped cross-section.

In some configurations of the seat recliner assembly of any one or more of the above paragraphs, the second portion defines a central aperture.

In some configurations of the seat recliner assembly of any one or more of the above paragraphs, each of the first and second recliner hearts includes a hub that has an aperture extending therethrough. The hubs include a plurality of ribs that define the aperture.

In some configurations of the seat recliner assembly of any one or more of the above paragraphs, the plurality of projections and the plurality of the ribs of the hubs cooperate to rotationally fix the hubs and the cross member to each other.

In some configurations of the seat recliner assembly of any one or more of the above paragraphs, each of the first and second recliner hearts includes a cam and a plurality of locking pawls. The cams are engaged with the locking pawls such that rotation of the cams causes corresponding movement of the locking pawls into and out of engagement with teeth of a ratchet plate. The hubs are coupled to the cams such that the cams rotate together with the cross member.

In some configurations of the seat recliner assembly of any one or more of the above paragraphs, the cross member has opposing ends. One of the opposing ends has an X-shaped cross-section and another of the opposing ends has a rectangular-shaped cross-section.

In some configurations of the seat recliner assembly of any one or more of the above paragraphs, a fastener extends through the hand lever and threadably engages the another of the opposing ends.

In another form, the present disclosures provides a seat recliner assembly that includes a seat bottom, a seatback, a first recliner heart, a second recliner heart, a hand lever and a cross member. The seatback is mounted to the seat bottom and rotatable relative to the seat bottom between a reclined position and an upright position. The first recliner heart is mounted to a first lateral side of the seat bottom and the seatback. The second recliner heart is mounted to a second lateral side of the seat bottom and the seatback. The hand lever is mounted to the first recliner heart and rotatable relative to the seat bottom to move the first recliner heart between a locked state and an unlocked state. The cross member is connected to the first and second recliner hearts and transmitting torque from the hand lever to the second recliner heart to move the second recliner heart with the first recliner heart between the locked and unlocked states. The cross member has a central part and a plurality of projections extending radially around and from the central part such that the plurality of projections are spaced apart from each other.

In some configurations of the seat recliner assembly of the above paragraph, the cross member includes a first portion and a second portion adjacent to the first portion. The central part and the plurality of projections define the first portion.

In some configurations of the seat recliner assembly of any one or more of the above paragraphs, the first portion has an X-shaped cross-section and the second portion has a rectangular-shaped cross-section.

In some configurations of the seat recliner assembly of any one or more of the above paragraphs, the second portion defines a central aperture.

In some configurations of the seat recliner assembly of any one or more of the above paragraphs, each of the first and second recliner hearts includes a hub that has an aperture extending therethrough. The hubs include a plurality of ribs that define the aperture.

In some configurations of the seat recliner assembly of any one or more of the above paragraphs, the plurality of projections and the plurality of the ribs of the hubs cooperate to rotationally fix the hubs and the cross member to each other.

In some configurations of the seat recliner assembly of any one or more of the above paragraphs, each of the first and second recliner hearts includes a cam and a plurality of locking pawls. The cams are engaged with the locking pawls such that rotation of the cams causes corresponding movement of the locking pawls into and out of engagement with teeth of a ratchet plate. The hubs are coupled to the cams such that the cams rotate together with the cross member.

In some configurations of the seat recliner assembly of any one or more of the above paragraphs, the cross member has opposing ends. One of the opposing ends has an X-shaped cross-section and another of the opposing ends has a rectangular-shaped cross-section.

In some configurations of the seat recliner assembly of any one or more of the above paragraphs, a fastener extends through the hand lever and threadably engages the another of the opposing ends.

In yet another form, the present disclosure provides a method for manufacturing a cross member for a vehicle seat recliner assembly. The method includes passing the cross member through a tooling assembly; moving the tool assembly to a first position for a predetermined time period to form a first portion of the cross member; and moving the tool assembly to a second position for a predetermined time period to form a second portion of the cross member.

In some configurations of the method of the above paragraph, the first portion of the cross member has an X-shaped cross-section and the second portion of the cross member has a rectangular-shaped cross-section.

In some configurations of the method of any one or more of the above paragraphs, the tooling assembly includes a first set of opposing tools and a second set of opposing tools. The first and second sets of tools are moved into engagement with the cross member when in the first position and are moved out of engagement with the cross member when in the second position.

In some configurations of the method of any one or more of the above paragraphs, a central aperture is formed in the second portion of the cross member after the cross member has been passed through the tooling assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a cross-sectional view of a tool assembly in a first position as a cross member of the recliner assembly is passed therethrough;

FIG. 10 is a cross-sectional view of the tool assembly in a second position as the cross member is passed therethrough;

Figure 11:
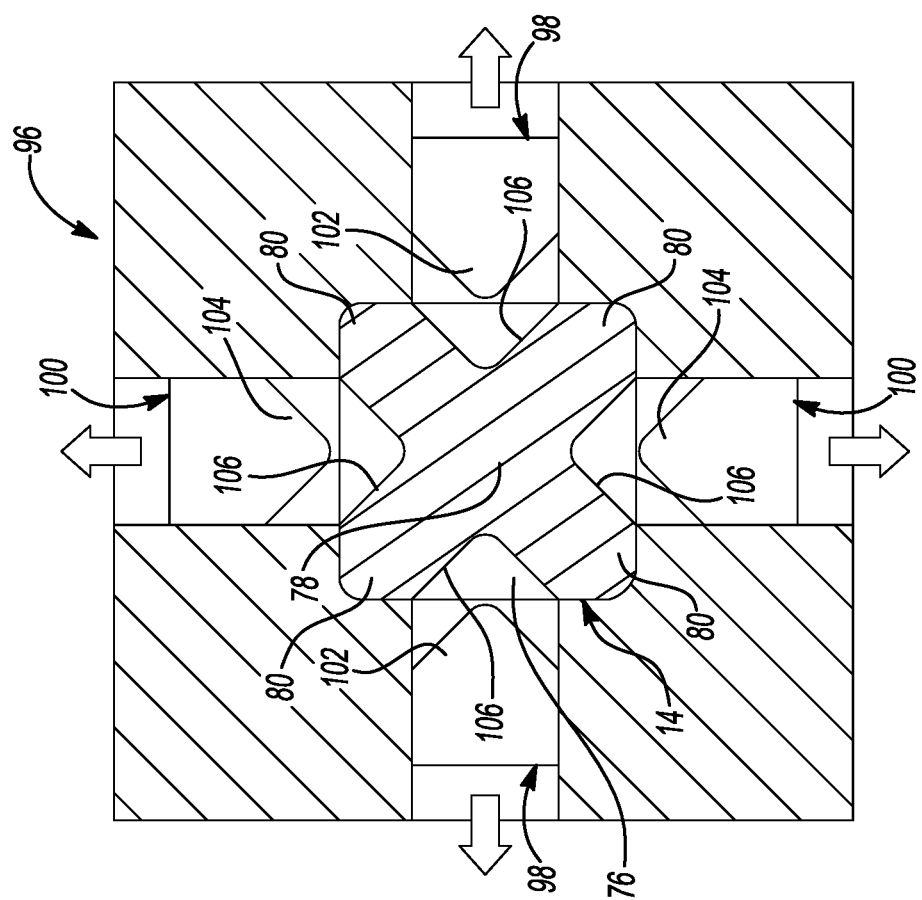
Figure 12:
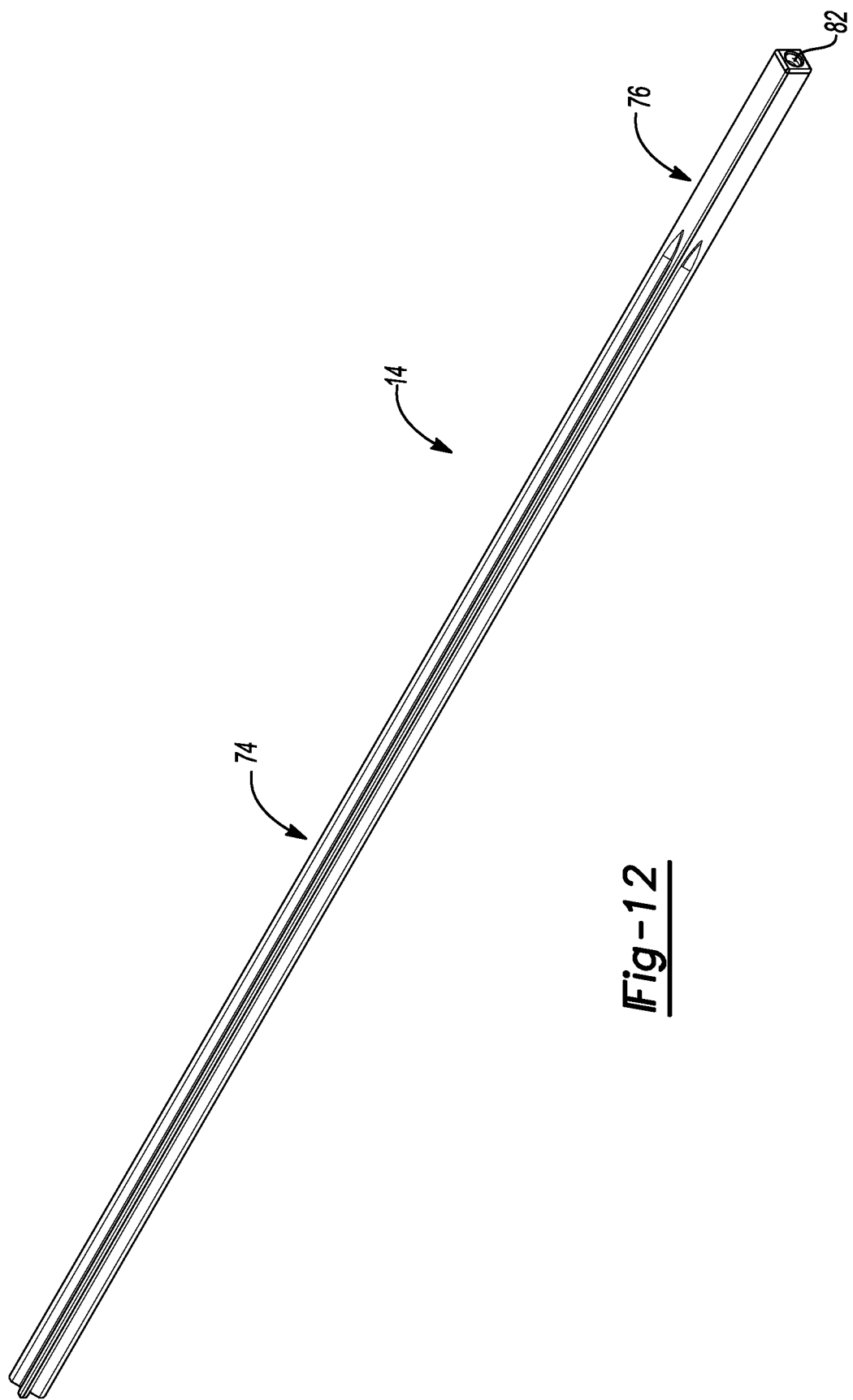

FIG. 11 another cross-sectional view of the tool assembly in the second position as the cross member is passed therethrough;

FIG. 12 is a perspective view of the manufactured cross member; and

Figure 13:
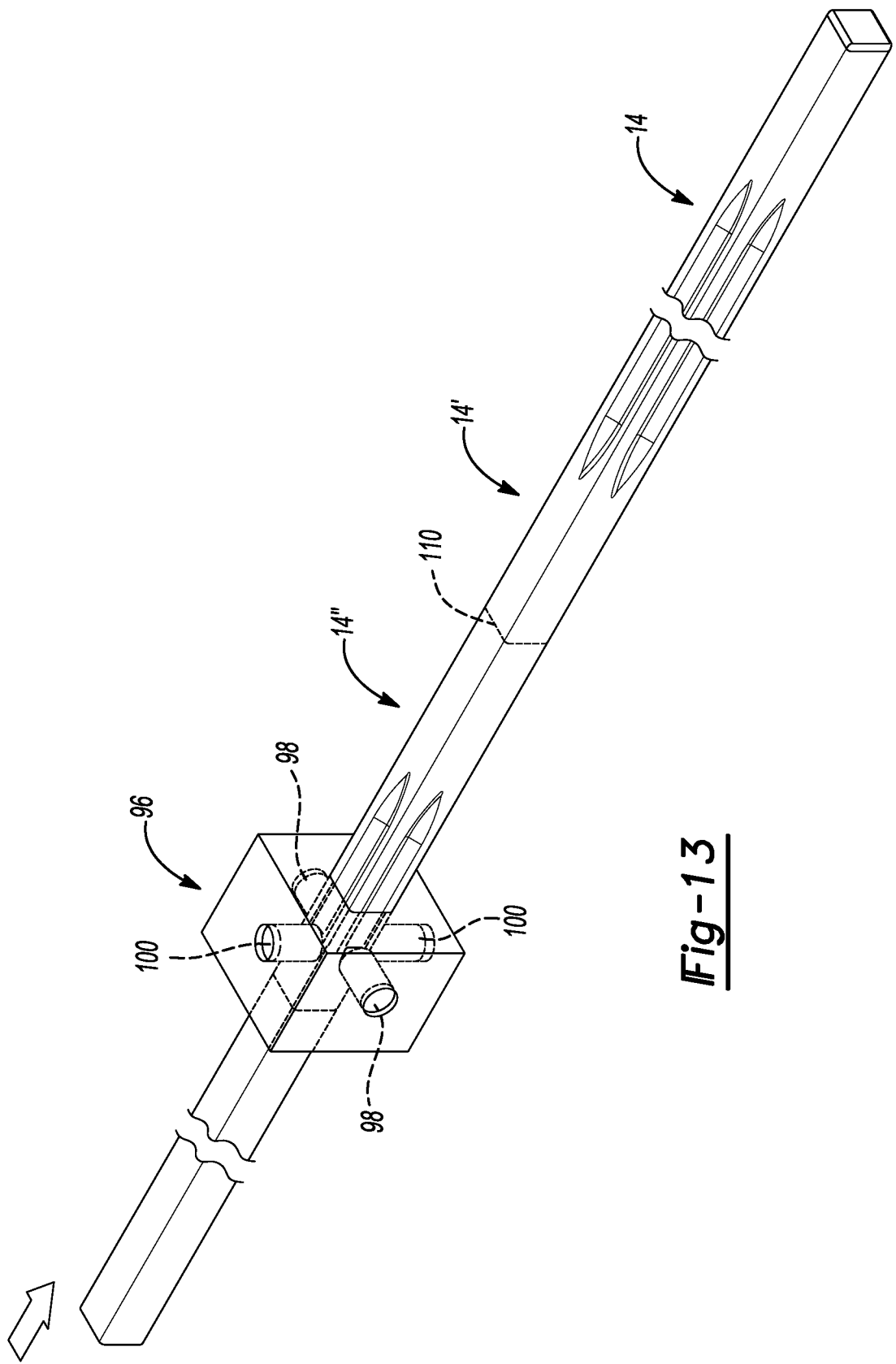

FIG. 13 is a perspective view of the tooling assembly manufacturing a plurality of cross members.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
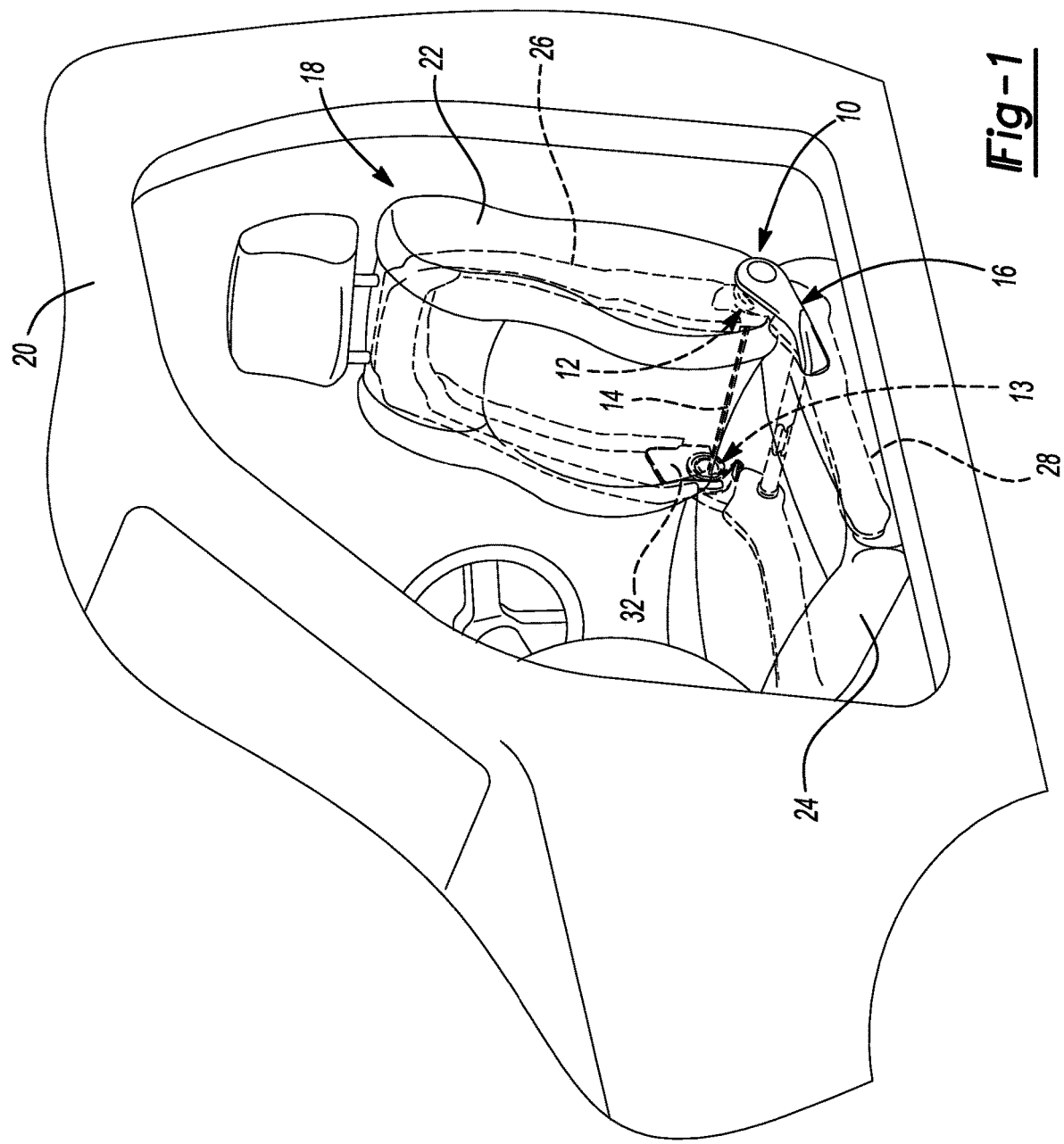
FIG. 1 is a partial perspective view of a vehicle having a seat incorporating a recliner assembly according to the principles of the present disclosure.
Figure 2:
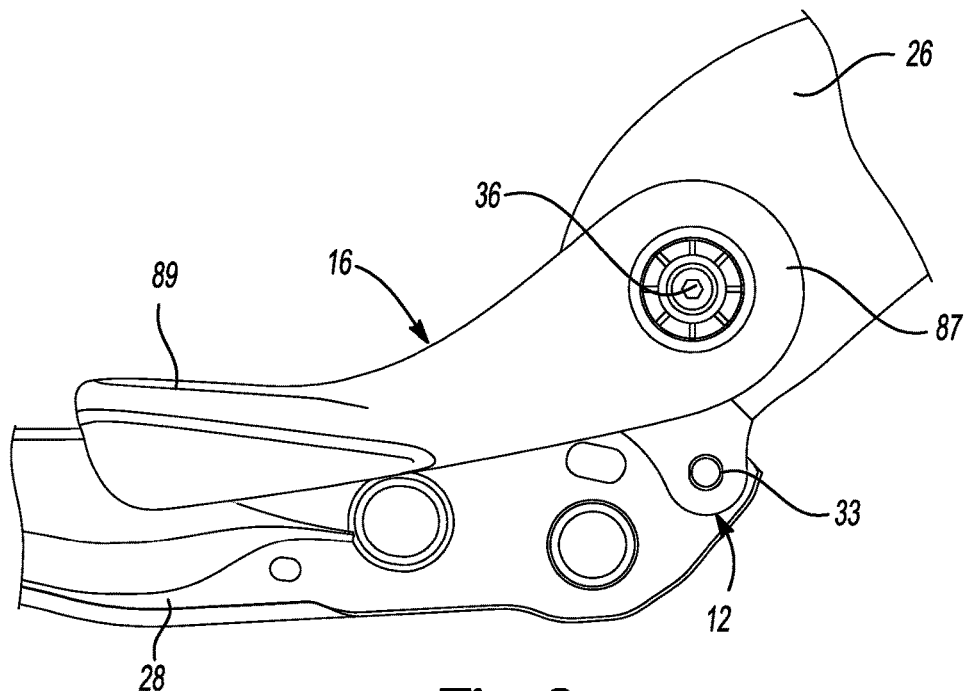
FIG. 2 is a side view of the recliner assembly of FIG. 1 with the seat in a reclined position.
Figure 3:
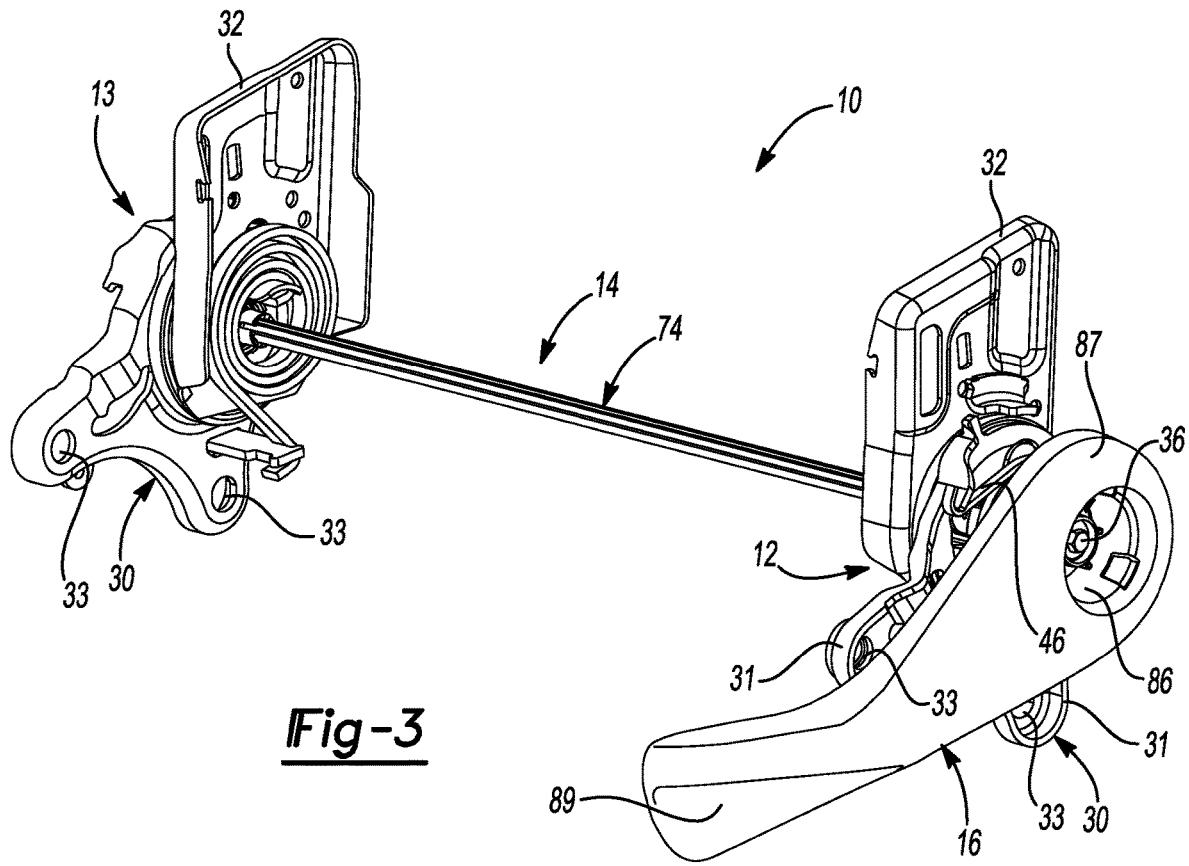
FIG. 3 is a perspective view of the recliner assembly of FIG. 1.

With reference to FIGS. 1-3, a recliner assembly 10 is provided that may be incorporated into a vehicle seat assembly 18 having a seatback 22 and a seat bottom 24. The seatback 22 and seat bottom 24 may include a seatback frame 26 and a seat bottom frame 28, respectively. The seat assembly 18 may be positioned in a vehicle 20, as shown in FIG. 1. The recliner assembly 10 may include a first recliner mechanism 12, a second recliner mechanism 13, a cross member 14, and a hand lever 16 (or release lever).

Figure 4:
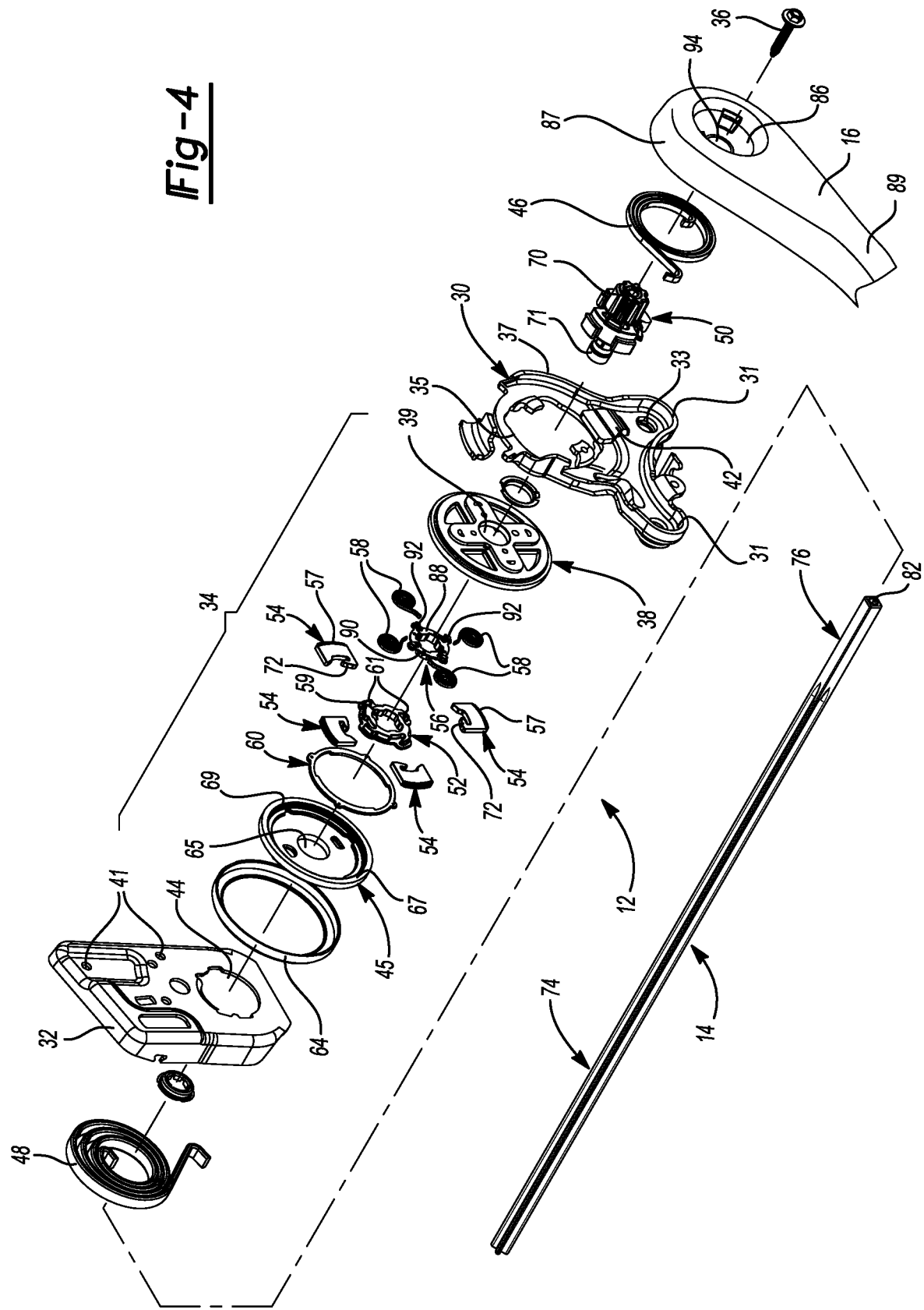
FIG. 4 is an exploded view of a portion of the recliner assembly of FIG. 1.

The first and second recliner mechanisms 12, 13 may be operable in a locked state preventing relative rotation between the seatback 22 and the seat bottom 24 and an unlocked state permitting relative rotation between the seatback 22 and seat bottom 24 among an upright position (FIG. 1), a rearward reclined position (FIG. 2) and a forward dump position (not shown). As shown in FIG. 4, the first recliner mechanism 12 may include a first bracket 30, a second bracket 32, a recliner heart (or locking mechanism) 34, an outer coil spring 46, an inner coil spring 48, and a hub 50.

Figure 5:
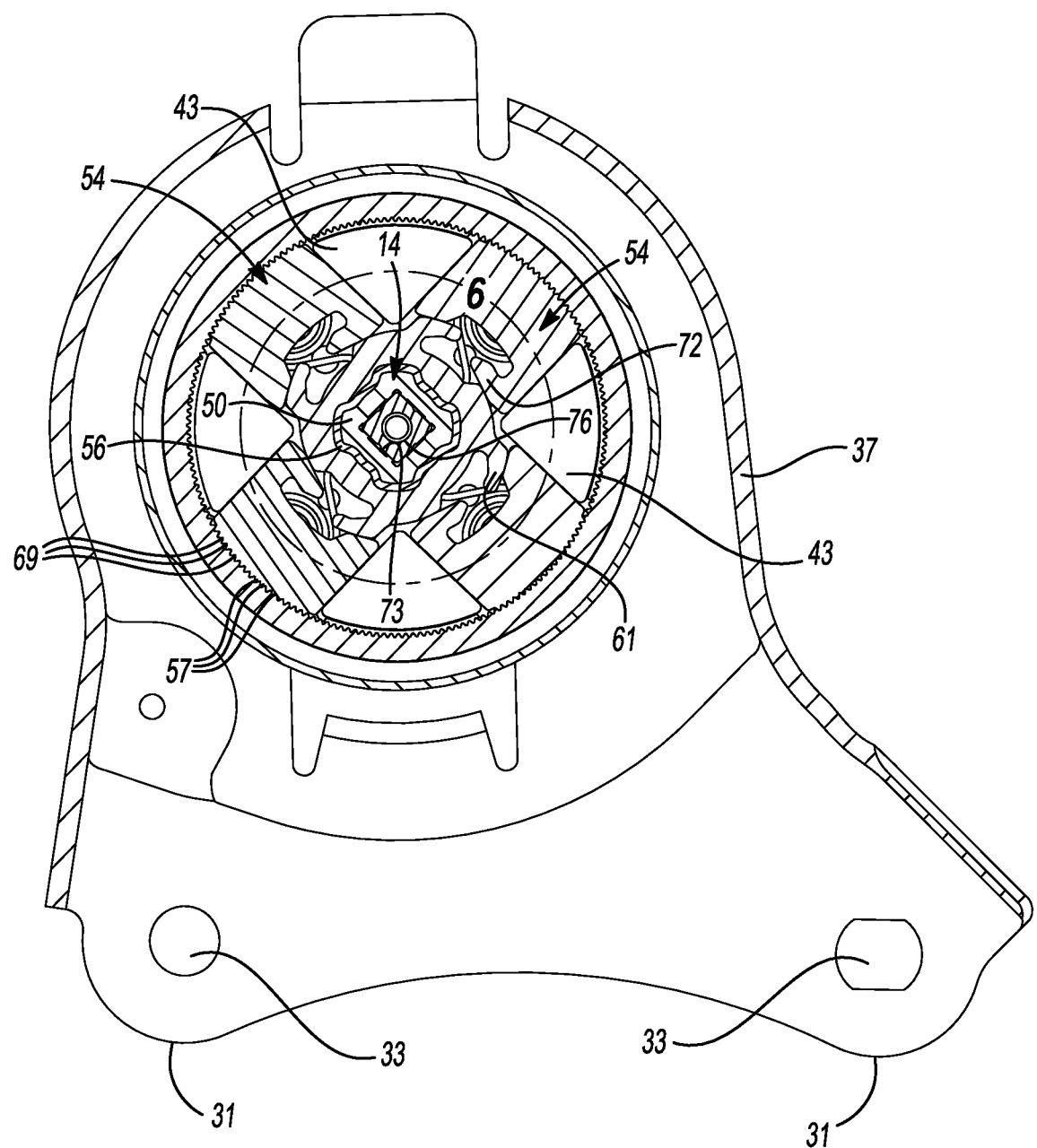
FIG. 5 is a cross-sectional view of a recliner mechanism of the recliner assembly of FIG. 1 in a locked state.
Figure 7:
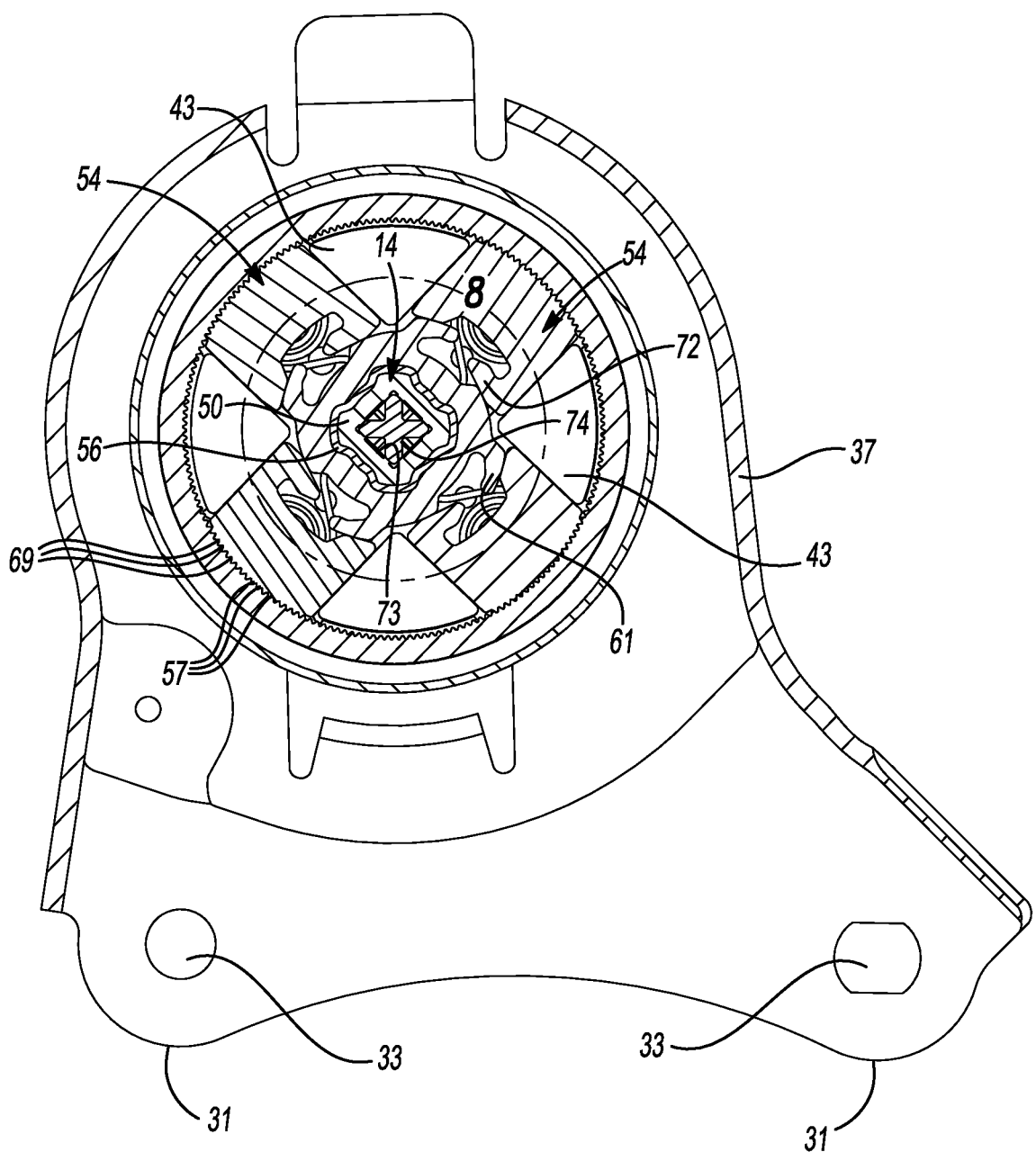
FIG. 7 is another cross-sectional view of the recliner mechanism of the recliner assembly of FIG. 1 in the locked state.

As shown in FIGS. 4, 5 and 7, the first bracket 30 may include a generally round main body 37 and a pair of mounting lobes 31 that extend outward from the main body 37. The main body 37 may include a central aperture 35 and a tab 42. The mounting lobes 31 may include a plurality of apertures 33 through which fasteners (not shown) may extend to securely attach the first bracket 30 to the seat bottom frame 28 of the seat assembly 18.

As shown in FIG. 4, the second bracket 32 may be generally rectangular and may include a plurality of apertures 41, and a central aperture 44 through which the cross member 14 extends. Fasteners (not shown) may extend through the plurality of apertures 41 to securely attach the second bracket 32 to the seatback frame 26 of the seat assembly 18.

With reference to FIG. 4, the recliner heart 34 may be mounted to the first and second brackets 30, 32 and may include a guide plate 38, a ratchet plate 45, a cam 52, a plurality of pawls 54, a connector disk 56, a plurality of coil springs 58, a control ring 60, and an encapsulation ring 64. The recliner heart 34 may be operable to lock the first recliner mechanism 12, thus preventing relative rotation between the seatback 22 and the seat bottom 24, and to also unlock the first recliner mechanism 12, thus permitting relative rotation between the seatback 22 and seat bottom 24.

The guide plate 38 may be mounted to the first bracket 30. The guide plate 38 may be a generally round, flat disk with a central aperture 39 (FIG. 4) and a plurality of bosses 43 (FIG. 5). Each of the pawls 54 is slidably received between corresponding adjacent bosses 43.

As shown in FIG. 4, the ratchet plate 45 may be a generally round, flat disk and may include a central aperture 65 and a cylindrical recess 67. The cylindrical recess 67 may include a plurality of teeth 69 (FIG. 5) disposed on an inner diameter defining the cylindrical recess 67. The second bracket 32 may be welded and/or otherwise suitably fixed to the seatback 22 and the ratchet plate 45 to attach the ratchet plate 45 to the seatback 22. The ratchet plate 45 may be mounted to the guide plate 38 with the cylindrical recess 67 disposed substantially concentric with outer radii of the bosses 43. The encapsulation ring 64 has a U-shaped cross-section and may be disposed generally around the peripheries of the ratchet plate 45 and the guide plate 38 to rotatably couple the ratchet plate 45 to the guide plate 38.

The plurality of pawls 54 may be radially disposed around the central aperture 39 on the guide plate 38 and may be slidably mounted to the guide plate 38 generally between the bosses 43 (FIGS. 5 and 7). An edge of each pawl 54 may include teeth 57 adapted for meshing engagement with the teeth 69 of the ratchet plate 45. Each pawl 54 may also include a latch 72 at an end opposite the teeth 57.

The cam 52 may be a generally round disk having an aperture 59 and a plurality of radial latch protrusions 61 arranged around the aperture 59. The cam 52 is rotatable relative to the pawls 54 and the ratchet plate 45 such that the latch protrusions 61 can selectively engage the latches 72 of the pawls 54 to move the pawls 54 out of engagement with the teeth 69 of the ratchet plate 45 (i.e., into the unlocked state).

The connector disk 56 is engaged with the cam 52 and the hub 50. As shown in FIG. 4, the connector disk 56 may include a disk portion 88 and an extrusion 90 extending perpendicularly from the disk portion 88. The disk portion 88 may have a plurality of flanges 92 extending therefrom. Each flange 92 is engaged with a corresponding one of the coil springs 58. Because each flange 92 is engaged to the corresponding spring 58, the connector disk 56 rotationally biases the cam 52 in a manner that causes the latch protrusions 61 to force the pawls 54 radially outwardly into the locked state, whereby the teeth 57 of the pawls 54 engage the teeth 69 of the ratchet plate 45.

The extrusion 90 of the connector disk 56 is engaged with the hub 50 and the cam 52 such that rotation of the hub 50 (which is caused by rotation of the hand lever 16) causes rotation of the cam 52 to move the pawls 54 radially into and out of engagement with the teeth 69 of the ratchet plate 45.

The outer coil spring 46 may exert a torsional force that biases the first recliner mechanism 12 toward a locked state.

The outer coil spring 46 may wrap around the hub 50 and engage the first bracket 30 and the hand lever 16. The inner coil spring 48 may extend around the cross member 14 and may engage the first and second brackets 30, 32 to rotationally bias the seatback 22 toward the upright position relative to the seat bottom 24.

The hub 50 may extend through the length of the recliner heart 34 and may include a first end 70 and a second end 71. The first end 70 may engage the hand lever 16 such that the hub 50 and the hand lever 16 are rotationally fixed to each other. A fastener 36 (e.g., a screw; shown in FIGS. 2-4) may extend through the hand lever 16 and threadably engage the cross member 14. The hub 50 may include a rectangular-shaped aperture 73 (FIGS. 5-8) that receives the cross member 14. The cross-sectional shape of the aperture 73 generally corresponds to the cross-sectional shape of a portion of the cross member 14 such that the cross member 14 and the hub 50 are rotationally fixed relative to each other. To enable the seatback 22 to pivot relative to the seat bottom 24, a user may pivot the hand lever 16 in a clockwise direction (relative to the view shown in FIG. 5) thus rotating the hub 50 (and consequently the cross member 14). Accordingly, clockwise rotation of the cross member 14 causes the cam 52 to similarly rotate in a clockwise direction relative to the plurality of pawls 54, overcoming a counterclockwise rotational bias of the outer coil spring 46.

The structure and function of the second recliner mechanism 13 may be similar or identical to that of the first recliner mechanism 12 and, therefore, will not be described again in detail.

With reference to FIGS. 3-8, the cross member 14 may extend in a cross-vehicle direction and may connect the first recliner mechanism 12 to the second recliner mechanism 13. In this way, the cross member 14 may transmit rotational motion of the first recliner mechanism 12 to the second recliner mechanism 13 to move the second recliner mechanism 13 between the locked and unlocked states simultaneously with motion of the first recliner mechanism 12 between the locked and unlocked states.

Figure 6:
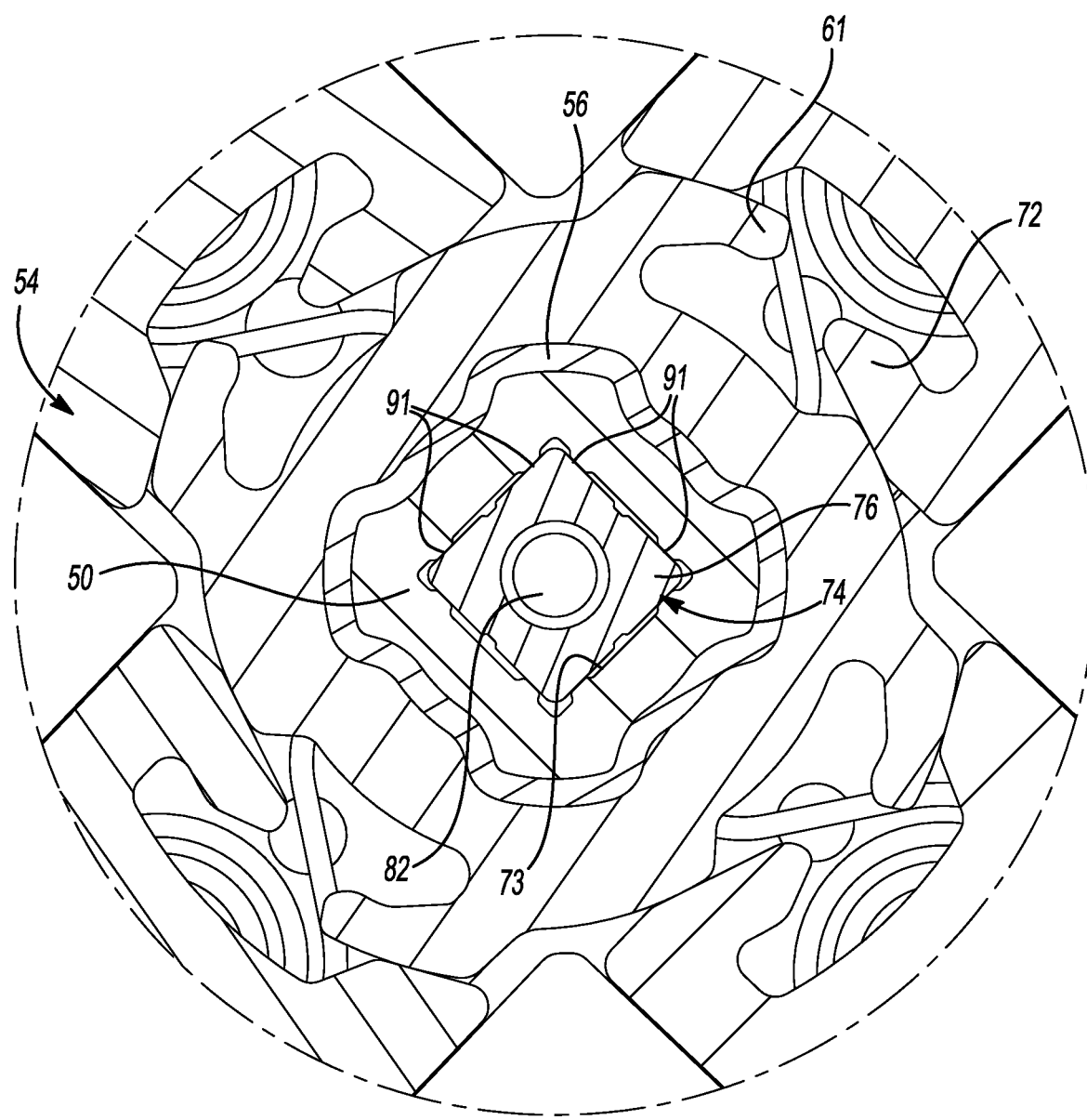
FIG. 6 is a close-up view of a portion of the recliner mechanism indicated as area 6 in FIG. 5.
Figure 8:
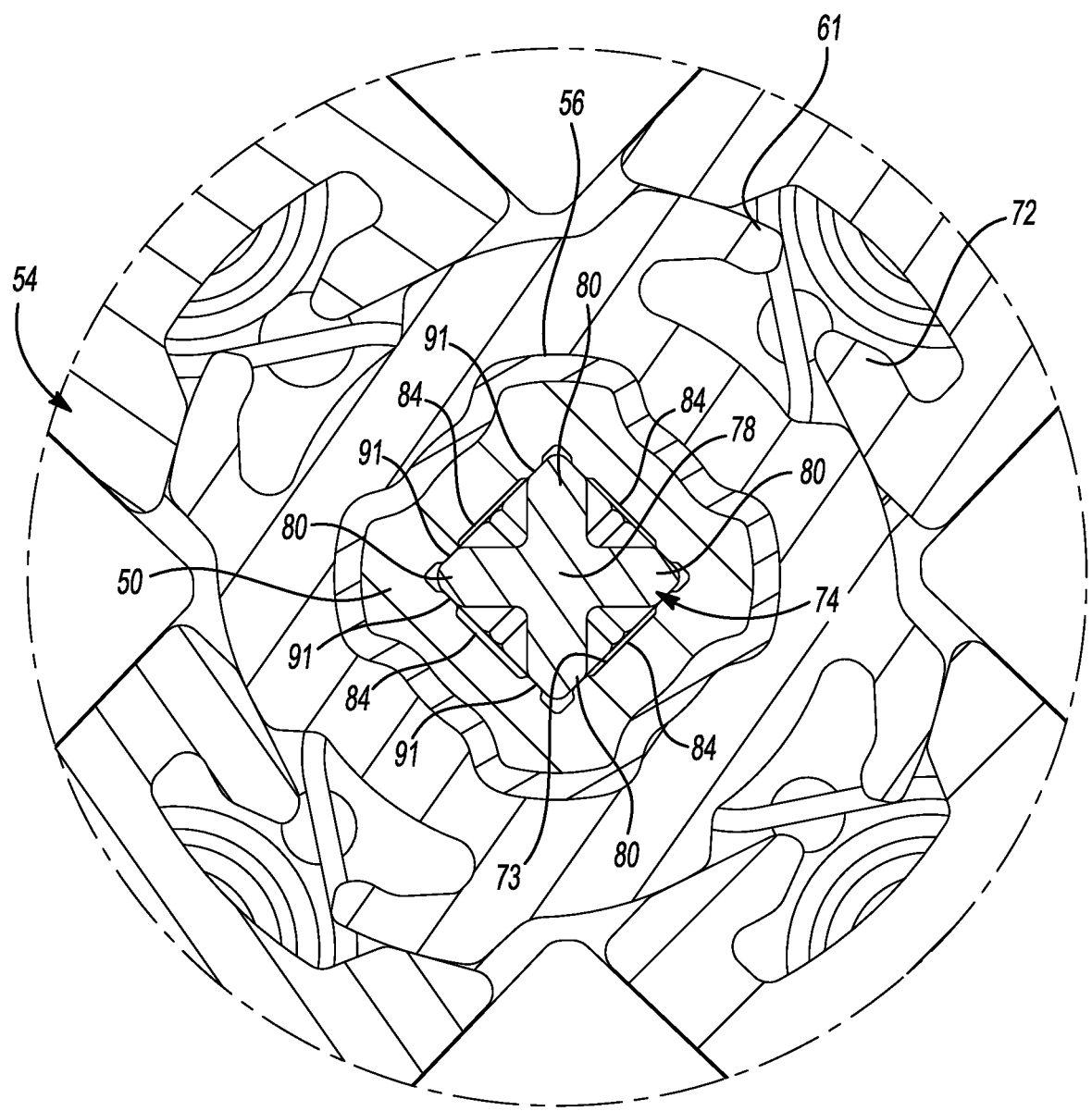
FIG. 8 is a close-up view of a portion of the recliner mechanism indicated as area 8 in FIG. 7.

As shown in FIGS. 4 and 12, the cross member 14 may have an X-shaped first portion 74 and a rectangular-shaped second portion 76 that is adjacent to the first portion 74. As shown in FIG. 8, the first portion 74 may have an X-shaped cross-section and may include a central part 78 and a plurality of projections 80. The plurality of projections 80 may extend radially around and from the central part 78 such that the projections 80 are spaced apart from each other. As shown in FIG. 6, the second portion 76 may have a rectangular/cross-sectional shape and may include a central aperture 82. In some configurations, the central aperture 82 may be threaded such that it threadably engages the fastener 36.

As shown in FIG. 8, the hub 50 may include a plurality of walls 84 that define the rectangular-shaped aperture 73 that receives the cross member 14. Each wall 84 may have a plurality of ribs 91 that extend inward from the wall 84 toward a center of the aperture 73. The ribs 91 may also extend from the wall 84 at or near opposing ends of the wall 84. When the cross member 14 is connected to the recliner mechanisms 12, 13, ends of each of the projections 80 may contact with two ribs 91 of adjacent walls 84 such that the cross member 14 and the hub 50 are rotationally fixed relative to each other. As shown in FIGS. 5 and 6, the shape of the aperture 73 generally corresponds to the shape of the second portion 76 of the cross member 14 such that the cross member 14 and the hub 50 are further rotationally fixed relative to each other. Stated another way, the ribs 91 may contact sides of the second portion 76 such that the cross member 14 and the hub 50 are rotationally fixed relative to each other.

As shown in FIGS. 2 and 3, the hand lever 16 may include a hub portion 87 and a handle portion 89. The hub portion 87 may include a recess 86. The recess 86 may include an aperture 94 (FIG. 4) through which the fastener 36 extends. The handle portion 89 may extend outward from the hub portion 87 and may be shaped to provide a comfortable gripping surface that a user can grip to actuate the hand lever 16. The hand lever 16 may be securely attached to the first end 70 of the hub 50, so that a rotational movement of the hand lever 16 causes the hub 50 (and consequently the cross member 14) to rotate. This rotational movement may function to lock and unlock the seat recliner mechanisms 12, 13 to selectively prevent and allow rotational motion of the seatback 22 relative to the seat bottom 24.

With continued reference to FIGS. 1-13, a method for manufacturing the cross member 14 will now be described in detail. The cross member 14 may be casted or machined as a single, solid elongated part. Thereafter, as shown in FIGS. 9-11, the cross member 14 is passed through a tooling assembly 96 (i.e., moved through the tooling assembly 96 in a direction along a longitudinal axis of the cross member 14) that includes a first set of opposing tools 98 and a second set of opposing tools 100. Each tool 98 of the first set of opposing tools 98 includes a triangular-shaped cutting head 102. Similarly, each tool 100 of the second set of opposing tools 100 includes a triangular-shaped cutting head 104. In some configurations, the cutting heads 102 and the cutting heads 104 may be of a different shape (e.g., square). In some configurations, the cutting heads 102 and the cutting heads 104 may be a milling cutter, or a fly cutter, for example.

As the cross member 14 is passed through the tooling assembly 96, the first and second sets of opposing tools 98, 100 move between first positions (i.e., moving perpendicularly to the longitudinal axis of the cross member 14 and into engagement with the cross member 14 (FIG. 10)) for a predetermined time period and second positions (i.e., moving perpendicularly to the longitudinal axis of the cross member 14 and out of engagement with the cross member 14 (FIGS. 9 and 11)) for a predetermined time period. It is understood that the first set of opposing tools 98 moves between the first and second position via a controller (not shown) and one or more actuators (e.g., hydraulic or electromechanical actuators), and the second set of opposing tools 100 moves between the first and second positions via a controller (not shown) and one or more actuators. In some configurations, the first and second sets of opposing tools 98, 100 move between the first and second positions via a single controller.

When the first and second sets of opposing tools 98, 100 are moved to the first position, the cutting heads 102 of the first set of opposing tools 98 and the cutting heads 104 of the second set of opposing tools 100 form V-shaped grooves 106 (FIGS. 10 and 11) in the cross member 14, thereby producing the first portion 74 (i.e., the central part 78 and the plurality of projections 80) of the cross member 14. When the first and second sets of opposing tools 98, 100 are moved to the second position, the rectangular-shaped second portion 76 of the cross member 14 is formed. In some configurations, the first and second sets of opposing tools 98, 100 may still be in engagement with the cross member 14 when in the second position to form the second portion 76.

As shown in FIG. 12, after the cross member 14 is passed through the tooling assembly 96, the central aperture 82 is formed in the second portion 76 of the cross member 14. In some configurations, the central aperture 82 may be threaded.

It should be understood that the tooling assembly 96 may be used to manufacture a plurality of cross members 14 from a single, solid elongated part. That is, the single, solid elongated part may be passed through the tooling assembly 96 where the first and second sets of opposing tools 98, 100 are repeatedly moved between the first and second positions. In this way, as shown in FIG. 13, a plurality of cross members 14, 14', 14" may be manufactured from the single, solid elongated part. The plurality of cross members 14, 14', 14" may be cut-off from each other before each cross member 14, 14', 14" has the central aperture 82 formed in the second portion 76. For example, FIG. 13 shows a cut line 110 between the cross members 14', 14". It should be understood that in some configurations, each of the cross members 14 may have an X-shaped cross-section along its entire length as oppose to only having a portion thereof with an X-shaped cross-section.

The X-shaped first portion 74 of the cross member 14 described herein makes the cross member 14 lighter weight (i.e., by removing material from the cross member 14) than conventional solid cross members with drilled holes at the ends while maintaining sufficient strength and rigidity. Furthermore, the X-shaped first portion 74 of the cross member 14 and the recliner mechanisms 12, 13 of the recliner assembly 10 are allowed to be rotationally fixed relative to each other. Furthermore, manufacturing the cross members 14 according to the process described above makes the cross members 14 significantly less expensive to produce, which reduces the cost of the cross members to customers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle seat recliner assembly comprising:
a first recliner heart mounted to a bracket;
a second recliner heart mounted to another bracket; and
a cross member connected to the first and second recliner hearts and transmitting torque from the first recliner heart to the second recliner heart to move the second recliner heart with the first recliner heart between a locked state and an unlocked state, the cross member having a central part and a plurality of projections extending radially outward from the central part and arranged around the central part such that the plurality of projections are spaced apart from each other,
wherein:
the cross member includes a first portion and a second portion adjacent to the first portion,
the first portion has a first cross-sectional shape that is different from a second cross-sectional shape of the second portion,
the first cross-sectional shape of the first portion has an X shape, and
the central part and the plurality of projections are integrally formed and cooperate to define the X-shape.

2. The vehicle seat recliner assembly of claim 1, wherein the second cross-sectional shape of the second portion has a rectangular shape.

3. The vehicle seat recliner assembly of claim 2, wherein the second portion defines a central aperture.

4. The vehicle seat recliner assembly of claim 1, wherein each of the first and second recliner hearts includes a hub that has an aperture extending therethrough, the hubs including a plurality of ribs that define the aperture.

5. The vehicle seat recliner assembly of claim 4, wherein the plurality of projections and the plurality of the ribs of the hubs cooperate to rotationally fix the hubs and the cross member to each other.

6. The vehicle seat recliner assembly of claim 5, wherein each of the first and second recliner hearts includes a cam and a plurality of locking pawls, the cams are engaged with the locking pawls such that rotation of the cams causes corresponding movement of the locking pawls into and out of engagement with teeth of a ratchet plate, wherein the hubs are coupled to the cams such that the cams rotate together with the cross member.

7. The vehicle seat recliner assembly of claim 1, wherein the cross member has opposing ends, wherein one of the opposing ends has an X-shaped cross-section, and wherein another of the opposing ends has a rectangular-shaped cross-section.

8. A vehicle seat recliner assembly comprising:
a seat bottom;
a seatback mounted to the seat bottom and rotatable relative to the seat bottom between a reclined position and an upright position;
a first recliner heart mounted to a first lateral side of the seat bottom and the seatback;
a second recliner heart mounted to a second lateral side of the seat bottom and the seatback; and
a cross member connected to the first and second recliner hearts and transmitting torque from the first recliner heart to the second recliner heart to move the second recliner heart with the first recliner heart between a locked state and an unlocked state, the cross member having a central part and a plurality of projections extending radially outward from the central part and arranged around the central part such that the plurality of projections are spaced apart from each other,
wherein:
the cross member includes a first portion and a second portion adjacent to the first portion,
the central part and the plurality of projections are integrally formed and cooperate to define a first cross-sectional shape of the first portion,
the first cross-sectional shape of the first portion is different from a second cross-sectional shape of the second portion,
the first cross-sectional shape of the first portion has an X-shape,
the central part and the plurality of projections are integrally formed and cooperate to define the X-shape, and
the second cross-sectional shape of the second portion has a rectangular shape.

9. The vehicle seat recliner assembly of claim 8, wherein the second portion defines a central aperture.

10. The vehicle seat recliner assembly of claim 8, wherein each of the first and second recliner hearts includes a hub that has an aperture extending therethrough, the hubs including a plurality of ribs that define the aperture.

11. The vehicle seat recliner assembly of claim 10, wherein the plurality of projections and the plurality of the ribs of the hubs cooperate to rotationally fix the hubs and the cross member to each other.

12. The vehicle seat recliner assembly of claim 11, wherein each of the first and second recliner hearts includes a cam and a plurality of locking pawls, the cams are engaged with the locking pawls such that rotation of the cams causes corresponding movement of the locking pawls into and out of engagement with teeth of a ratchet plate, wherein the hubs are coupled to the cams such that the cams rotate together with the cross member.

13. The vehicle seat recliner assembly of claim 8, wherein the cross member has opposing ends, wherein one of the opposing ends has an X-shaped cross-section, and wherein another of the opposing ends has a rectangular-shaped cross-section.

14. A vehicle seat recliner assembly comprising:
a first recliner heart mounted to a bracket;
a second recliner heart mounted to another bracket; and
a cross member connected to the first and second recliner hearts and transmitting torque from the first recliner heart to the second recliner heart to move the second recliner heart with the first recliner heart between a locked state and an unlocked state, the cross member having a central part and a plurality of projections extending radially outward from the central part and arranged around the central part such that the plurality of projections are spaced apart from each other,
wherein each of the first and second recliner hearts includes a hub that has an aperture extending therethrough, the hubs including a plurality of ribs that define the aperture,
wherein the plurality of projections of the cross member and the plurality of the ribs of the hubs cooperate to rotationally fix the hubs and the cross member to each other, and
wherein each of the first and second recliner hearts includes a cam and a plurality of locking pawls, wherein the cams are engaged with the locking pawls such that rotation of the cams causes corresponding movement of the locking pawls into and out of engagement with teeth of a ratchet plate, and wherein the hubs are coupled to the cams such that the cams rotate together with the cross member.

15. The vehicle seat recliner assembly of claim 14, wherein the cross member includes a first portion and a second portion, and wherein the central part and the plurality of projections are integrally formed and define the first portion.

16. The vehicle seat recliner assembly of claim 15, wherein the first portion has an X-shaped cross-section, the central part and the plurality of projections cooperate to define the X-shaped cross-section, and wherein the second portion has a rectangular-shaped cross-section.

17. The vehicle seat recliner assembly of claim 16, wherein the second portion defines a central aperture.

18. The vehicle seat recliner assembly of claim 14, wherein the cross member has opposing ends, wherein one of the opposing ends has an X-shaped cross section, and wherein another of the opposing ends has a rectangular-shaped cross-section.

* * * * *